United States Patent [19]

Bougher et al.

[11] Patent Number: 5,039,169
[45] Date of Patent: Aug. 13, 1991

[54] ADJUSTABLE LOCK INFANT SEAT

[75] Inventors: Jerry D. Bougher, Lebanon; Allan R. Lortz, Carmel, both of Ind.

[73] Assignee: Indiana Mills & Manufacturing, Inc., Westfield, Ind.

[21] Appl. No.: 541,702

[22] Filed: Jun. 21, 1990

[51] Int. Cl.⁵ ............................................. A47C 31/00
[52] U.S. Cl. .................................. 297/484; 297/467; 297/479
[58] Field of Search .............. 297/250, 467, 484, 483, 297/479

[56] References Cited

U.S. PATENT DOCUMENTS

| | | | |
|---|---|---|---|
| 3,325,213 | 6/1967 | Levy | 297/250 |
| 4,186,962 | 2/1980 | Meeker | 297/467 |
| 4,342,483 | 8/1982 | Takada | 297/467 |
| 4,660,889 | 4/1987 | Anthony et al. | 297/467 |
| 4,679,852 | 7/1987 | Anthony et al. | 297/464 |
| 4,688,849 | 8/1987 | Tsuge et al. | 297/250 |
| 4,886,315 | 12/1989 | Johnson | 297/250 |

Primary Examiner—Kenneth J. Dorner
Assistant Examiner—Cassandra L. Hope
Attorney, Agent, or Firm—Woodard, Emhardt, Naughton, Moriarty & McNett

[57] ABSTRACT

An adjustable lock infant seat. An infant seat positionable atop an automobile seat, includes a seat belt buckle mounted to the bottom or seat portion of the infant seat. The buckle is lockingly engageable with a tongue slidably mounted to a belt having opposite ends extending through a lower pair of slots or an upper pair of slots extending through the back support of the infant seat. One belt end is fastened to a buckle located on the rearward surface of the back support whereas the opposite belt end extends through a releasably lockable adjuster mounted to the back support. By extending the belt either through the upper or lower slots and by operation of the adjuster, the belt may be sized to fit the infant.

16 Claims, 2 Drawing Sheets

5,039,169

ADJUSTABLE LOCK INFANT SEAT

BACKGROUND OF THE INVENTION

1. Field of the Invention

This invention is in the field of infant or child seats mountable within an automobile.

2. Description of the Prior Art

U.S. Pat. No. 4,679,852 commonly owned by Indiana Mills & Manufacturing, Inc. therein discloses a child seat for holding a child within an automobile. The seat includes a harness assembly which may be sized for the child occupying the seat. In the commonly owned U.S. Pat. No. 4,660,889, the harness adjuster includes a spring biased pivotably mounted cam for releasably locking the harness once the harness has been properly sized.

The aforementioned patents disclose mounting the adjuster forward of the seat portion. In many cases, it is mandatory that the child or infant seat be positioned within the automobile so that the child faces toward the rear of the automobile. As a result, it is desirable that any harness adjuster be positioned rearward of the infant seat to allow ease of access to the adjuster. Disclosed herein is an infant seat designed to be positioned so that the infant faces toward the rear of the automobile with the harness adjuster mounted to the back of the seat which, in turn, is the most forward portion of the infant seat when positioned in the automobile.

SUMMARY OF THE INVENTION

An infant seat which is adjustable to the size of the infant comprising a seat including a back portion and a seat portion upon which an infant may be placed. The back portion includes slots extending therethrough with the slots including a first slot and a second slot spaced apart. The seat further includes a first lock mounted to the seat and a second lock releasably lockable with the first lock with a belt having a first end portion mounted to the seat and an opposite second end portion. The belt extending from the first end portion through the first slot and then to the second lock and back through the second slot. The seat also includes an adjuster mounted to the seat releasably holding the second end portion of the belt and having a release position allowing the belt to be moved through the second slot to tighten and size the belt relative to the infant and alter the distance between the belt and the back portion depending upon the size of the infant and further having a holding position securing the belt in place.

It is an object of the present invention to provide a superior infant seat for securing an infant in a vehicle.

It is a further object of the present invention to provide an infant seat having means for adjusting the harness to the size of the infant.

It is an additional object of the present invention to provide an infant seat with harness for mounting upon an vehicle seat facing the infant toward the rear of the vehicle while providing for adjustment of the harness at the forward facing portion of the infant seat.

Related objects and advantages of the present invention will be apparent from the following description.

DESCRIPTION OF THE PREFERRED EMBODIMENT

Figure 1:
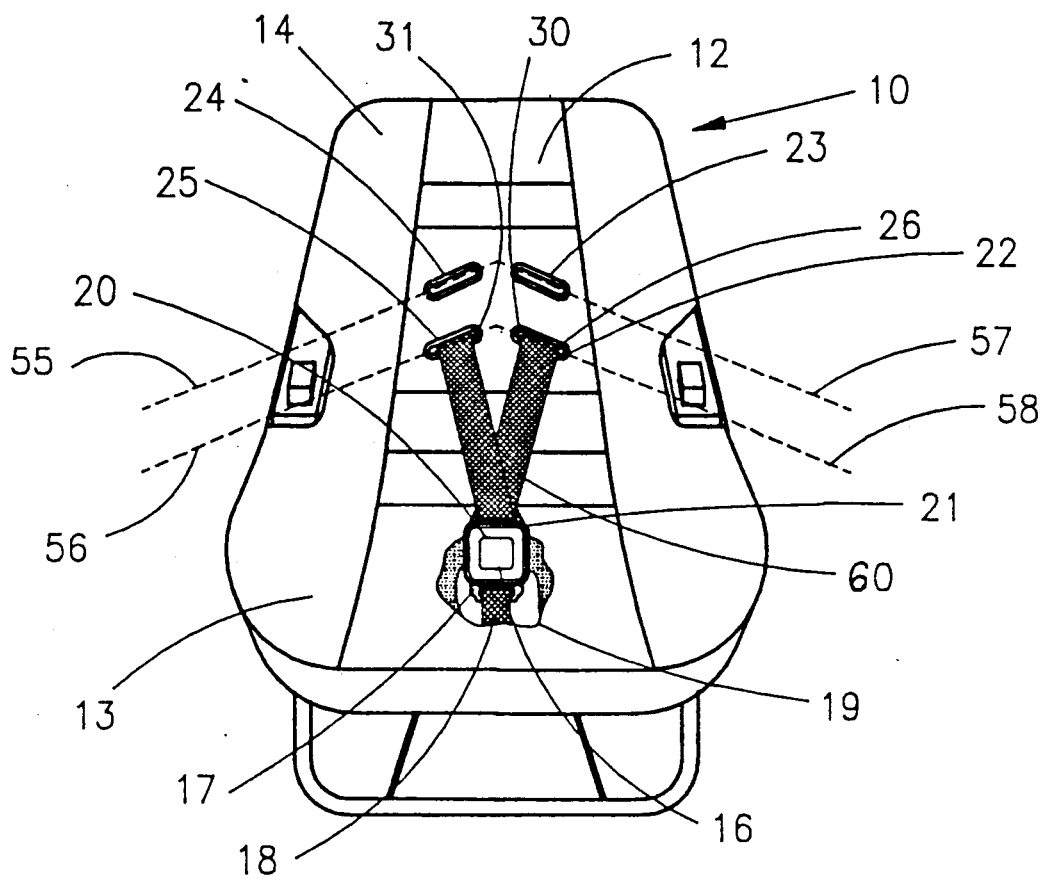
FIG. 1 is a fragmentary front view of an infant seat incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
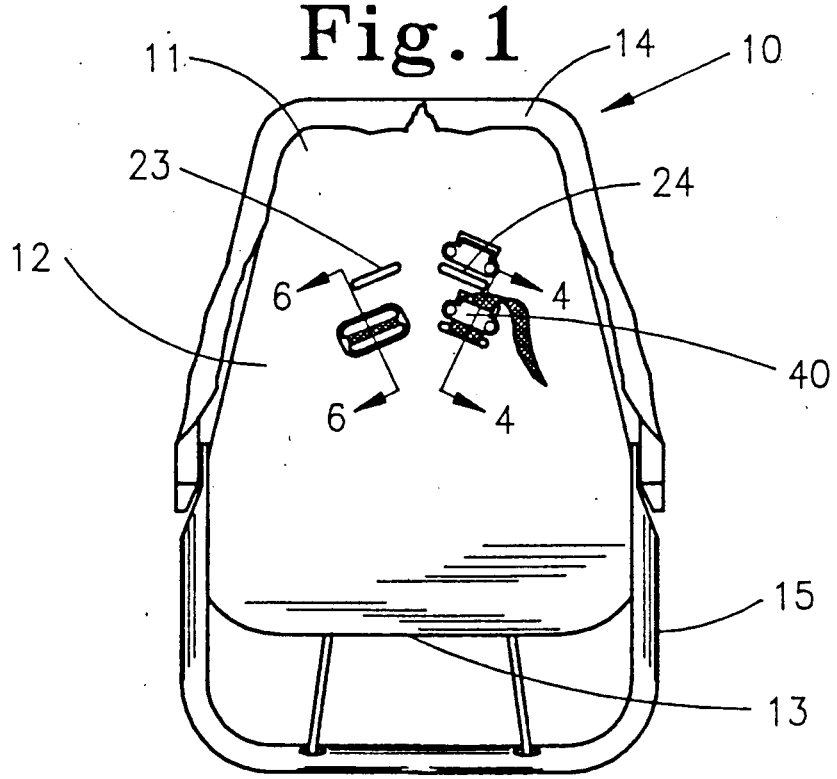
FIG. 2 is a rear view of the seat of FIG. 1.

Referring now more particularly to FIGS. 1 and 2, therein shown an infant seat 10 having a plastic mainframe 11 forming a back support portion 12 and a seat support portion 13. Removably mounted to frame 11 is a conventional fabric cushion 14 which may be removed for cleaning purposes. Frame 11 is mounted to a conventional rod support frame 15 for holding the seat upon an automobile seat.

A conventional seat belt buckle 16 has a bottom end 17 with a slot formed therein allowing a web 18 to be affixed thereto with the opposite end of the web secured to bottom seat 13 of frame 11. Cushion 14 is fragmented at location 19 to illustrate that buckle 16 is fixedly secured to seat support portion 13. The top end 20 of buckle 16 has a tongue receiving mouth to releasably receive a conventional seat belt buckle tongue 21 in turn slidably mounted to harness 22. Tongue 21 is of conventional design and includes a distal end with an aperture therein to lockingly receive a conventional spring biased pawl within buckle 16. The buckle includes a push button to release the pawl from the tongue thereby allowing for removal of the tongue from the buckle. Likewise, the tongue may be inserted into the buckle to lockingly engage the pawl thereby securing the tongue and buckle together.

An upper pair of slots 23 and 24 and a lower pair of slots 25 and 26 are formed in back support portion 11 and also extend through cushion 14. Harness 22 extends through either the upper pair of slots or lower pair of slots with the opposite ends of the harness secured on the back side of the back support frame. In the illustration of FIGS. 1 and 2, harness 22 which is a belt has its opposite end portions extending through the lower pair of slots 25 and 26, it being understood that the belt may be removed from the slots and then rethreaded through the upper pair of slots 23 and 24. In the event the infant is relatively large, the belt is extended through the upper pair of slots whereas the belt is instead extended through the lower pair of slots if the infant is smaller.

Figure 6:
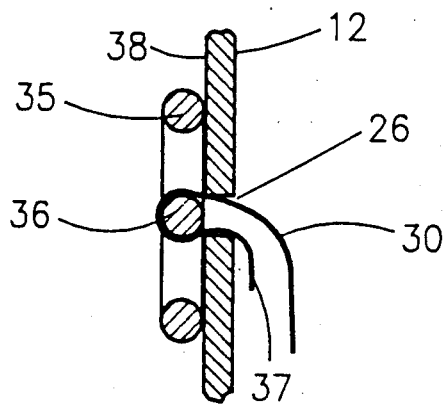
FIG. 6 is an enlarged cross-sectional view taken along the line 6—6 of FIG. 2 and viewed in the direction of the arrows.

End portion 30 (FIG. 6) of harness or belt 22 is threaded through slot 26 and extends around middle rung 36 of a conventional buckle 35. End portion 30 of the belt then extends back through slot 26 resting upon the forward surface of back support portion 12. Buckle 35 is thereby forced against the rearward surface 38 of the back support portion 12 when the belt is pulled forwardly. In order to remove the belt from slot 26, end 37 of the belt is pulled through slot 26 and around middle rung 36 with the belt then being pulled forwardly through the slot. The belt may then be extended through slot 23 and around middle rung 36 of buckle 35 which may be positioned adjacent slot 23 in lieu of slot 26.

Figure 3:
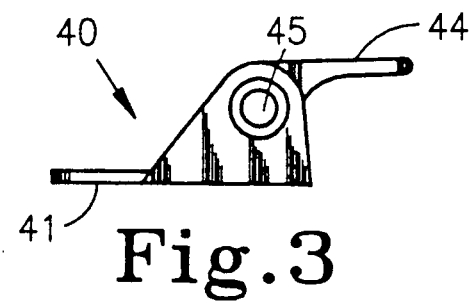
FIG. 3 is an enlarged side view of the adjuster for sizing the harness.

A pair of identical adjusters are mounted to the back surface of back support portion 12 adjacent slots 24 and 25 and are operable to releasably hold end portion 31 of the belt when the belt is extended respectively through slot 24 or slot 25. Adjuster 40 adjacent slot 25 will now be described it being understood that an identical description applies to the adjuster adjacent slot 24. Adjuster 40 (FIGS. 3-5) includes a base 41 integrally joined to a pair of upstanding walls 42 and 43 which pivotably receive a spring biased cam 44 mounted by pivot rod 51 having a pivot axis parallel to the slot 25. The cam includes a plurality of teeth or ridges 48 which extend across the width of the cam with a spring 49 being operable to force the teeth 48 into engagement with belt 22 holding the belt between the cam and base 41. A pair of finger depressions 46 and 47 are provided on the top surface of the cam and may be forced downwardly against the action of spring 49 thereby pivoting the cam in a counter-clockwise direction as viewed in FIG. 4 moving the teeth away from the belt and allowing the belt to be pulled through the adjuster. Spring 49 extends around the pivot shaft 51 in turn mounted to the upstanding walls 42 and 43. One end of spring 49 is secured to pivot rod 51 whereas the opposite end of the spring is secured to either wall 42 or wall 43. The ends 45 of the pivot rod 51 may be secured to walls 42 and 43 by conventional means. Such an adjuster is disclosed in the commonly owned U.S. Pat. No. 4,679,852 which is herewith incorporated by reference. The only difference between the adjuster disclosed in the aforementioned patent and the adjuster disclosed herein is the present adjuster includes a pair of finger depressions 46 and 47 and further the ridges or teeth 48 hold the web against base 41 in lieu of a cross-bar fastened to the upstanding walls and positioned above the base plate.

Figure 4:
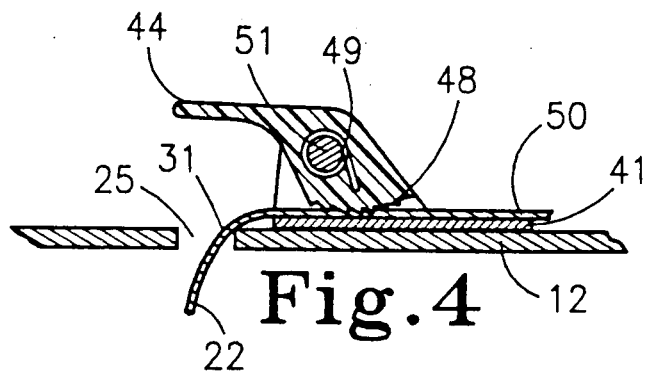
FIG. 4 is an enlarged cross-sectional view taken along the line 4—4 o 2 and viewed in the direction of the arrows.
Figure 5:
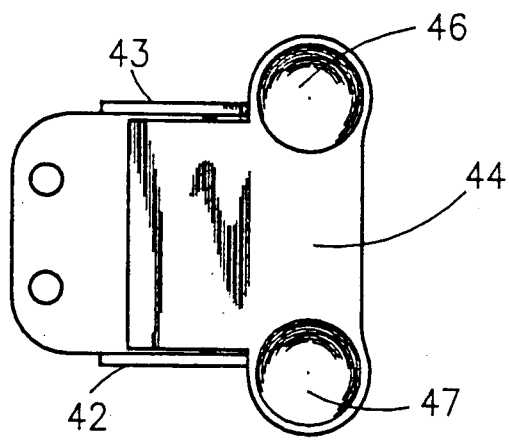
FIG. 5 is a top view of the adjuster of FIG. 3.

End 31 of belt 22 is shown in FIG. 1 as extending through slot 25 and then atop base wall 41 (FIG. 4) with teeth 48 holding the belt relative to the adjuster. In order to tighten the harness, cam 44 may be pivoted in a counter-clockwise direction as shown in FIG. 4 with end 50 of the belt then being pulled outwardly. The belt has an intermediate lower portion 60 spaced equidistant between the opposite ends of the belt with intermediate portion 60 extending slidably through a slot in tongue 21. The tongue is therefore centered or equidistant between slots 25 and 26 regardless of the adjustments made to the belt. Intermediate portion 60 is located downwardly from the slots located above the buckle. Thus, by pivoting cam 44 in a counter-clockwise direction as viewed in FIG. 4, the teeth are moved apart from the belt thereby allowing end 50 of the belt to be pulled to the right tightening and sizing the belt relative to the child and altering the distance between the belt and the forward surface of back portion 12. That is, with the tongue lockingly engaged with the buckle, by pulling the belt through the adjuster, the belt is caused to move through a slot formed in the end of tongue 21 tightening belt 22 and moving portion 60 of belt 22 toward the forward surface of the back support portion whereas by pulling the belt through the adjuster in the opposite direction, the belt 22 may be thereby pulled outwardly from the forward surface of the back support position allowing for a larger child or infant to fit between the belt and the harness. In the event the infant is relatively tall thereby positioning the infant shoulders a greater distance above the seat support portion 13, then the opposite ends of the belt may be pulled from the lower pair of slots and extended through the upper pair of slots engaging buckle 35 and the adjuster 39.

Many variations are contemplated and included in the present invention. For example, slots 24 and 25 are shown as having parallel longitudinal axis 55 and 56 which converge respectively with the parallel longitudinal axis 57 and 58 of respectively slots 23 and 26. Alternatively, all longitudinal axis may be parallel and would not have to be angularly displaced as shown in FIG. 1. The upper slots 23 and 24 are horizontally aligned in that the slots are positioned equidistant above seat support 13. Likewise, slots 25 and 26 are horizontally aligned being located immediately beneath the upper slots.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An infant seat adjustable to the size of a infant comprising:

a seat including a back portion and a seat portion upon which an infant may be placed, said back portion including slots extending therethrough with said slots including a first slot and a second slot spaced apart;

a first locking means mounted to said seat;

a second locking means releasably lockable with said first locking means;

a belt having a first end portion mounted to said seat and an opposite second end portion, said belt extending from said first end portion through said first slot and then to said second locking means and back through said second slot; and, adjustment means mounted to said seat and releasably holding said second end portion of said belt, said adjustment means having a release position allowing said belt to be made through said second slot to tighten and size the belt relative to the infant and alter the distance between said belt and said back portion depending upon the size of the infant and further having a holding position securing said belt in place; and wherein:

said adjustment means is mounted to and behind said back portion and includes spring means operable to bias said adjustment means to said holding position but releasable to allow said adjustment means to move said release position;

said belt is slidably mounted to said second locking means allowing said second locking means to be centered between said first slot and said second slot regardless of the adjustment of said belt by said adjustment means; and, said adjustment means includes a first bracket affixed to and behind said back portion with a pair of upstanding flanges and further includes a first handled cam pivotally mounted to said flanges, said spring means is secured between said first handled cam and said flanges and is operable to force said first handled cam toward said first bracket holding said belt therebetween when in said holding position.

2. The infant seat of claim 1 wherein:
said adjustment means further includes a second bracket affixed to and behind said back portion with a second pair of upstanding flanges and includes a second handled cam pivotally mounted to said second pair of upstanding flanges, a second spring means is secured between said second handled cam and said second pair of flanges and is operable to force said second handled cam toward said second bracket holding said belt therebetween when in said holding position.

3. The infant seat of claim 1 wherein:
said cam includes a pair of finger depressions located outwardly of said flanges to facilitate ease of pivoting motion of said cam.

4. The infant seat of claim 3 wherein:
said slots include a third slot above said first slot and a fourth slot above said second slot, said belt is removable from said first slot and said second slot when said adjustment means is in said release position with said belt rethreadable through said third slot and said fourth slot raising said belt to hold a larger sized infant.

5. The infant seat of claim 4 wherein:
said first slot and said second slot are horizontally aligned and have converging longitudinal axes, said third slot and said fourth slot are horizontally aligned and have converging longitudinal axes;
said adjustment means includes a second bracket affixed to and behind said back portion with a second pair of upstanding flanges and further includes a second handled cam pivotally mounted to said second pair of upstanding flanges, said spring means includes a second spring secured between said second handled cam and said second pair of upstanding flanges and is operable to force said second handled cam toward said second bracket holding said belt therebetween when in said holding position;
said first handled cam and said second handled cam each include a pivot axis parallel to said second slot and said fourth slot; and,
said first bracket is mounted adjacent said second slot and said second bracket is mounted adjacent said fourth slot.

6. A child seat comprising:
a main frame for supporting a child;
a seat belt buckle mounted to said frame;
a seat belt having a first end portion secured to said main frame and further having a second end portion releasably secured to said main frame, said seat belt having an intermediate portion located between said first end portion and said second end portion;
a seat belt buckle tongue mounted to said belt at said intermediate portion with said buckle and said tongue releasably lockable together; and,
adjustment means mounted to said frame and releasably holding said second end portion of said belt, said adjustment means having a release position allowing said belt to be moved to size the belt relative to the child and alter the distance between said belt and said frame depending upon the size of the child and further having a holding position securing said belt in place; and wherein;
said frame includes a back support portion to support the back of the child with said belt mounted to said back support portion, said frame further includes a leg support portion to support the legs of the child, said buckle is positioned on said leg support portion to receive said tongue and hold said belt over the child when said tongue is locked to said buckle;
said tongue includes a hole through which said belt slidably extends mounting said tongue thereto and allowing said tongue to be centered on said intermediate portion; and,
said adjustment means includes a bracket affixed to and behind said back support portion with a pair of upstanding flanges and spring means operable to bias said adjustment means to said holding position but releasable to allow said adjustment means to move to said release position, said adjustment means includes a first handled cam pivotally mounted to said flanges, said spring means positioned between said cam and said flanges and is operable to force said cam toward said bracket holding said belt therebetween when in said holding position.

7. The seat of claim 6 wherein:
said cam includes a pair of finger depressions located outwardly of aid flanges to facilitate ease of pivoting motion of said cam.

8. The seat of claim 7 wherein:
said back support portion including a first slot and a second slot extending therethrough with said second slot located above said first slot, said first end portion secured to said frame and then extending downwardly across the child to said tongue and back upwardly through said first slot to said adjustment means located on and behind said back support portion, said adjustment means when in said release portion allowing said second end portion of said belt to be removed from said first slot and rethreaded through said second slot to raise said belt and hold a larger sized child.

9. A child seat restraint for a vehicle comprising:
a main frame including a seat portion and a back portion, said back portion including a pair of upper slots and a pair of lower slots;
a buckle mounted to said seat portion and located between the less of a child when resting thereon;
a seat belt having opposite end portions and an intermediate portion located therebetween, said belt having said end portions secured rearwardly of and to said back portion of said main frame and then extending through said lower slots and downwardly to said buckle;
a buckle tongue mounted to said belt at said intermediate portion with said tongue and said buckle releasably lockable together; and,
adjustment means mounted to said frame and releasably holding one of said end portions,
said adjustment means having a release position and operable when in said release position to allow said belt to be moved through a lower slot to tighten and size the belt relative to the child and alter the distance between said belt and said back portion depending upon the size of the child and further having a holding position securing said belt in place, said adjustment means further operable when in said release position to allow said belt to be removed from said lower slot and rethreaded through an upper slot raising said belt to hold a larger sized child; and wherein:

said adjustment means includes a bracket affixed to and behind said back portion with a pair of upstanding flanges and further includes a handled cam pivotally mounted to said flanges, said adjustment means includes spring means between said cam and said flanges operable to force said cam toward said bracket holding said belt therebetween when in said holding position.

10. The restraint of claim 9 wherein:
said cam includes a pair of finger depressions located outwardly of said flanges to facilitate ease of pivoting motion of said cam.

11. Ann infant seat adjustable to the size of a infant comprising:

a seat including a back portion and a seat portion upon which an infant may be placed, said back portion including slots extending therethroough with said slots including a first slot and a second slot spaced apart;

a first locking means mounted to said seat;

a second locking means releasably lockable with said first locking means;

a belt having a first end portion mounted to said seat and an opposite second end portion, said belt extending from said first end portion through said first slot and then to said second locking means and back through said second slot; and, adjustment means mounted to said seat and releasably holding said second end portion of said belt, said adjustment means including a bracket affixed to said seat and a holding member pivotally mounted to said bracket, said adjustment means further including a spring means mounted too said bracket and engaged with said holding member operable to force said holding member toward said seat and against said belt to hold said belt in a fixed position relative to said seat, said spring means being yieldable to allow said holding member to move away from said seat permitting movement of said belt through said second slot to tighten and size said belt relative too the infant and alter the distance between said belt and said back portion depending upon the size of the infant.

12. The infant seat of claim 11 wherein:

said adjustment means further includes a pair of upstanding flanges having said holding member mounted thereto and therebetween.

13. The infant seat of claim 12 wherein:
said holding member includes a lever handle located outwardly of said flanges to pivot said holding member when said lever handle is moved.

14. An infant seat adjustable to the size of a infant comprising:

a seat including a back portion and a seat portion upon which an infant may be placed, said back portion including slots extending therethrough with said slots including a first slot and a second slot spaced apart;

a first locking means mounted to said seat;

a second locking means releasably lockable with said first locking means;

belt means having an end portion, said belt means extending from said end portion through said first slot to said second locking means, said belt means extending from said second locking means through said second slot; and adjustment means mounted to said seat and releasably holding said end portion of said belt means, said adjustment means including a bracket with a pair of upstanding walls and a handled cam pivotally mounted to said upstanding walls, said adjustment means further including spring means secured between said handled cam and said upstanding walls and operable to force said handled cam toward said seat holding said end portion of said belt means therebetween, said spring means being yieldable to allow said handled cam to move away from said seat permitting movement of said belt means relative to said seat to tighten and size said belt means relative to the infant and alter the distance between said belt means and said back portion depending upon the size of the infant.

15. The infant seat of claim 14 wherein:
said handled cam includes a pair of finger depressions located outwardly of said walls too facilitate ease of pivoting motion of said cam.

16. The infant seat of claim 14 wherein:
said slots include a third slot above said first slot and a fourth slot above said second slot, said belt means is removable from said first slot and said second slot and rethreadable through said third slot and said fourth slot raising said belt means to hold a larger sized infant.

* * * * *

UNITED STATES PATENT AND TRADEMARK OFFICE
CERTIFICATE OF CORRECTION

PATENT NO. : 5,039,169

DATED : August 13, 1991

INVENTOR(S) : Jerry D. Bougher, et al.

It is certified that error appears in the above-identified patent and that said Letters Patent is hereby corrected as shown below:

In Column 2, line 4, please change "4-4 o 2" to --4-4 of FIG. 2--.

In Column 4, line 49, please change "made" to --moved--.

In Column 6 line 28, please change "aid" to --said--.

In Column 6 line 49, please change "less of" to --legs of--.

In Column 7 line 18, please change "Ann" to --An--.

In Column 7 line 22, please change "therethroough" to --therethrough--.

In Column 7 line 39, please change "too said" to --to said--.

In Column 8 line 41, plesae change "walls too" to --walls to--.

Signed and Sealed this

Eighth Day of December, 1992

Attest:

DOUGLAS B. COMER

*Attesting Officer*     Acting Commissioner of Patents and Trademarks